United States Patent
Kim et al.

(10) Patent No.: US 10,231,218 B2
(45) Date of Patent: *Mar. 12, 2019

(54) METHOD FOR TRANSMITTING A RESPONSE REQUEST FRAME AND A RESPONSE FRAME IN A MULTI-USER BASED WIRELESS COMMUNICATION SYSTEM

(71) Applicant: ELECTRONICS AND TELECOMMUNICATIONS RESEARCH INSTITUTE, Daejeon (KR)

(72) Inventors: Yun Joo Kim, Suwon (KR); Jee Yon Choi, Daejeon (KR); Sok-Kyu Lee, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/755,329

(22) Filed: Jun. 30, 2015

(65) Prior Publication Data

US 2015/0305019 A1   Oct. 22, 2015

Related U.S. Application Data

(63) Continuation of application No. 13/479,218, filed on May 23, 2012, now Pat. No. 9,107,185, which is a (Continued)

(30) Foreign Application Priority Data

Nov. 24, 2009  (KR) .................. 10-2009-0113916

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1854* (2013.01); *H04W 72/0446* (2013.01);
(Continued)

(58) Field of Classification Search
None
See application file for complete search history.

(56) References Cited

U.S. PATENT DOCUMENTS

| | | | |
|---|---|---|---|
| 9,107,185 B2 * | 8/2015 | Kim | ............... H04L 1/1854 |
| 2005/0002355 A1 | 1/2005 | Takano | |

(Continued)

FOREIGN PATENT DOCUMENTS

| | | |
|---|---|---|
| EP | 2493129 A2 | 8/2012 |
| WO | 2009/027931 A2 | 3/2009 |

OTHER PUBLICATIONS

Ricardo Moraes et al., "VTP-CSMA: A Virtual Token Passing Approach for Real-Time Communication in IEEE 802.11 Wireless Networks", IEEE Transactions on Industrial Informatics, Aug. 2007, vol. 3, No. 3, IEEE.

(Continued)

*Primary Examiner* — Alex Skripnikov

(57) ABSTRACT

The present invention relates to a method for efficient transmission of a request frame such as an RTS/CTS frame and a response frame in response to the request frame in a multi-user based wireless communication system. The method of the present invention comprises: a process where wireless terminals transmit a response frame at their own response frame transmission time through a request frame that contains information about a plurality of wireless terminals and information about the response frame transmission time of the respective wireless terminals; a process where the respective wireless terminals transmit a response frame according to a token scheme such that the response (Continued)

frame is transmitted to a final access point; and a process where only a representative wireless terminal selected depending on a given wireless environment receives the response frame.

22 Claims, 6 Drawing Sheets

Related U.S. Application Data continuation of application No. PCT/KR2010/008362, filed on Nov. 24, 2010.

(51) Int. Cl.
*H04W 74/00* (2009.01)
*H04W 28/04* (2009.01)
*H04W 84/12* (2009.01)

(52) U.S. Cl.
CPC .......... *H04W 74/002* (2013.01); *H04W 28/04* (2013.01); *H04W 74/004* (2013.01); *H04W 74/006* (2013.01); *H04W 84/12* (2013.01)

(56) References Cited

U.S. PATENT DOCUMENTS

| 2005/0135284 | A1 | 6/2005 | Nanda et al. | |
| 2006/0050661 | A1* | 3/2006 | Shim | H04W 28/18 370/318 |
| 2007/0259672 | A1* | 11/2007 | Heo | H04W 72/042 455/452.2 |
| 2008/0112351 | A1 | 5/2008 | Surineni et al. | |
| 2009/0040990 | A1 | 2/2009 | Xhafa et al. | |
| 2010/0046492 | A1* | 2/2010 | Abraham | H04W 56/00 370/342 |
| 2010/0118785 | A1* | 5/2010 | Sugaya | H04W 74/0816 370/328 |
| 2010/0322166 | A1* | 12/2010 | Sampath | H04W 72/121 370/329 |

OTHER PUBLICATIONS

International Search Report for PCT/KR2010/008362 filed on Nov. 24, 2010.

Lin X. Cai et al, "A Distributed Multi-User MIMO MAC Protocol for Wireless Local Area Networks", IEEE "GLOBECOM" 2008 proceedings, 2008, pp. 1-5, IEEE Communications Society.

Mirkovic et al, "Channel Aware Scheduling in MU-DCF WLANs", IEEE, 2007, pp. 1184-1187.

\* cited by examiner

FIG. 2

| Multi-user ID$_1$ | response frame transmission time T$_1$ | Multi-user ID$_2$ | response frame transmission time T$_2$ | ...... | Multi-user ID$_k$ | response frame transmission time T$_k$ |

FIG. 3

| Token = n | Next multi-user ID$_2$ | Next multi-user ID$_3$ | ...... | Next multi_user ID$_n$ |

FIG. 4

| Token = n - k | Next multi-user ID$_{k+1}$ | Next multi-user ID$_{k+2}$ | ...... | Next multi-user ID$_n$ |

METHOD FOR TRANSMITTING A RESPONSE REQUEST FRAME AND A RESPONSE FRAME IN A MULTI-USER BASED WIRELESS COMMUNICATION SYSTEM

CROSS-REFERENCE TO RELATED APPLICATIONS

The present application is a continuation of the U.S. patent application Ser. No. 13/479,218, filed on May 23, 2012, which is a By-pass continuation Patent Application No. PCT/KR2010/008362, filed on Nov. 24, 2010, which claims priority to Korean Patent Application 10-2009-0113916, filed on Nov. 24, 2009, which are incorporated by reference in their entirety.

TECHNICAL FIELD

Exemplary embodiments of the present invention relate to a method for transmitting a response request frame and a response frame in a wireless communication system, and more particularly, to a method for effectively transmitting a request frame such as a Request to Send/Clear to Send frame (RTS/CTS) and a response frame thereof in a multi-user wireless communication system.

BACKGROUND ART

A wireless local area network (WLAN) basically supports an access point (AP) for a distributed system (DS) and a basic service set (BSS) formed of a plurality of stations (STA).

A Medium Access Control (MAC) protocol of a WLAN operates based on a carrier sense multiple access/collision avoidance (CSMA/CA). Accordingly, a WLAN may waste resources in channel competition. In order to overcome such a problem, an enhanced MAC protocol defined in IEEE 802.11 (e) introduced a burst transmission scheme. The burst transmission scheme transmits multiple MPDUs with a short inter-frame space (SIFS) during a transmission opportunity time (TXOP) when a transmission right for a wireless resource is obtained. Further, the burst transmission scheme receives a Block ACK frame in response to the multiple MPDUs.

Further, IEEE 802.11(n) defines an Aggregated MSDU (A-MSDU) scheme and an Aggregated MPDU (A-MPDU) scheme. The Aggregated MSDU (A-MSDU) scheme packs multiple MSDUs together into an A-MSDU and transported within a single MPDU and the Aggregated MPDU (A-MPDU) scheme packs multiple MPDUs together into an A-MPDU and transported as a single transmission unit in order to reduce overhead such as SIFS intervals. In general, a minimum SIFS interval is maintained when MPDUs are individually transmitted.

Lately, users for a WLAN have been abruptly increased. In order to increase data throughput provided from one BSS, IEEE 802.11 (ac) has been developing a standard for a very high throughput (VHT) WLAN system.

The VHT WLAN system is capable of supporting a maximum throughput of 1 Gbps for MAC SAP of an access point in three multiple stations environments including one access point (AP) and two stations (STA) and supporting a maximum throughput of 500 Mbps for MAC SAP of a wireless station in point-to-point environment. Each access point (AP) and station of a VHT WLAN are designed to support comparability to an existing WLAN system (IEEE 802.11a/n).

A wireless station obtaining a transmission opportunity is required to receive response through an ACK frame or a response frame in response to a transmitted frame in order to enhance reliability of wireless communication in a wireless communication system such as WLAN.

Such response includes an immediate response and a delayed response. The immediate response is a response (ACK frame) for single data. The block response for successive transmission or an aggregated MPDU corresponds to both of the immediate response and the delayed response.

The immediate response is to transmit a response frame with a short time interval such as a short inter-frame space (SIFS) when PHY-RXEND.primitive is generated for a received request frame in order to prevent other stations from transmitting data. As described above, a request and response frame exchange sequence is performed as a pair. Here, the immediate response frame such as an ACK frame or a CTS frame may not include a transmission address.

Unlike the immediate response, the delayed response transmits an ACK frame at first as a basic response that informs whether a request has been received or not and transmits a response frame including requested information later. The response frame is transmitted through an enhanced distributed channel access (EDCA) or based on a piggyback scheme with other frame. In the delayed response, a transmitting station receiving a response frame from a receiving station informs the receiving station whether a response frame has been received or not through an ACK frame again.

As described above, the request and response frame exchange sequence in a WLAN may be adapted at a multi-user wireless communication system. In case of supporting a multi-user multiple input multiple output (MU-MIMO) technology for uplink, wireless stations receiving frames may transmit response frames at the same time after a predetermined interval (IFS) between frames according to the frame exchange sequence.

Meanwhile, a wireless station receiving a frame is required to transmit a response frame with a time interval or using different channels for better throughput regardless of supporting the MU-MIMO technology for uplink.

A method for exchanging frames with a time interval and using a same bandwidth in a WLAN system includes a method for exchanging a response request frame and a response frame through channel access by a wireless station, and a method for sequentially transmitting a response frame at a plurality of wireless stations through one request frame.

That is, in the method for exchanging a request frame and a response frame through channel access by a wireless station, an access point (AP) transmits a request frame to a first wireless station through channel access and the first wireless station transmits a response frame with a short time interval such as SIFS. Then, the access point (AP) transmits a request frame to a second wireless station through second channel access and the second wireless station transmits a response frame with a short time interval such as SIFS.

In the method for sequentially transmitting response frames at a plurality of wireless stations through one request frame, one request frame including information on addresses of multiple users is transmitted through channel access. Then, a plurality of terminals sequentially transmits response frames with a short inter-frame space in response to the request frame.

Such a related request and response frame exchange sequence is performed after deciding a transmitting station and a receiving station, and the request frame and the response frame are exchanged with a short time interval such as SIFS in order to prevent other wireless station from obtaining a transmission right.

However, there has been a demand for developing a method for exchanging a request frame and a response frame effectively although a response frame does not include information on an address of a transmitting station like an ACK frame for a data frame or like a CTS frame for a RTS frame in a MU-MIMO wireless communication environment.

DISCLOSURE

Technical Problem

An embodiment of the present invention is directed to a method for transmitting a request frame and a response frame in order to effectively exchange a request frame and a response frame in a multi-user multiple input multiple output (MU-MIMO) wireless communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

An embodiment of the present invention provides a method for transmitting a response frame at a corresponding response frame transmission time at each wireless station through a request frame having information on a plurality of wireless stations and information on a response frame transmission time of each wireless station.

That is, the method for transmitting a request frame requesting a response to a plurality of wireless stations in a multi-user multiple input multiple output (MU-MIMO) wireless communication system, includes: generating the request frame having an indicator for informing that there are a plurality of wireless stations to receive a frame and multi-user information on the plurality of wireless stations; and transmitting the generated request frame. The multi-user information may include multi-user identifier (ID) information and response frame transmission time information of each wireless station.

Also, a method for transmitting a request frame requesting a response to a plurality of wireless stations in a MU-MIMO wireless communication system, includes: receiving the request frame having an indicator and multi-user information, wherein the indicator indicates presence of a plurality of wireless stations receiving a frame and the multi-user information is information on the plurality of wireless stations; and transmitting a response frame at a corresponding response frame transmission time based on the multi-user information included in the request frame.

The response frame transmission time information may be information about response frame transmission times of wireless stations, and a response frame transmission time of a predetermined wireless station may be decided based on a sum of duration for transmitting previous response frames and intervals between the previous response frames, wherein the previous response frames are response frames transmitted before the predetermined wireless station.

Another embodiment of the present invention provides a method for transmitting a response frame to a final access point by transmitting a response frame based on a token scheme at each wireless station.

That is, a method for transmitting a request frame requesting a response frame to a plurality of wireless stations in a MU-MIMO wireless communication system, includes: generating the request frame having a next multi-user identifier list and a token after setting up wireless station information as a receiving station address, wherein the network multi-user identifier is information on wireless stations that do not transmit the response frame among a plurality of wireless station, the token is reduced according to transmission of a response frame, and the wireless station information is information on a wireless station to transmit a next response frame; and transmitting the generated request frame.

Also, a method for transmitting a request frame requesting a response frame to a plurality of wireless stations in a MU-MIMO wireless communication system, includes: receiving the request frame having a next multi-user identifier list and a token, wherein the next multi-user identifier list is information on wireless stations that do not transmit the response frame and the token is reduced according to transmission of a response frame; and transmitting a response frame reconfigured by setting up one of identifiers in the next multi-user identifier list, reducing the token, and excluding the identifier setup as the address of the receiving station.

When all multi-user identifiers included in the next multi-user identifier list are set up as an address of a receiving station, the next multi-user identifier may be set up as 'null'.

A wireless station receiving the next multi-user identifier setup as 'null' and the token setup as '0' may transmit the response frame by setting up an address of a receiving station for the response frame as an address of an access point.

When a predetermined wireless station fails to transmit the response frame, a wireless station transmitting a response frame by setting up an address of a receiving station as the predetermined wireless station may transmit a response frame to other wireless station included in the next multi-user identifier list.

The predetermined wireless station failed may receive a request frame from an access point and may transmit a response frame.

After the predetermined wireless station receives a response frame from other wireless station, the predetermined wireless station may transmit a response frame by setting up an address of a receiving station as an address of an access point.

Yet another embodiment of the present invention provides a method for receiving a response frame only for a representative wireless station decided according to wireless environment.

That is, a method for transmitting a request frame requesting a response to a plurality of wireless stations in a MU-MIMO wireless communication system includes: selecting a representative wireless station to transmit a response frame from a plurality of stations according to wireless environment such as a channel quality; and transmitting a request frame by setting up an address of a receiving station based on information on the selected representative wireless station.

The request frame may further include information on the number of multi-user stations and multi-user identifiers.

When it is failed to receive a response frame from the representative wireless station, an access point may transmit a request frame by setting up other wireless station as a representative wireless station to transmit a response frame according to the wireless environment.

When it is failed to receive a response frame from the selected representative wireless station, an access point may retransmit a request frame to the selected representative wireless station.

Advantageous Effects

In accordance with embodiments of the present invention, it is possible to effectively exchange a request frame and a response frame although a response frame does not include an address of a transmitting station like an ACK frame for a data frame or like a CTS frame for a RTS frame in a MU-MIMO wireless communication system. Accordingly, a wireless service performance provided to a user is improved, and a power management function and a comparability function can be applied.

DESCRIPTION OF DRAWINGS

FIG. 2 is a diagram illustrating a structure of multi-user information using a response frame transmission time in accordance with a first embodiment of the present invention.

FIGS. 3 and 4 illustrate a structure of multi-user information using a token scheme in accordance with a second embodiment of the present invention.

BEST MODE

Figure 1:
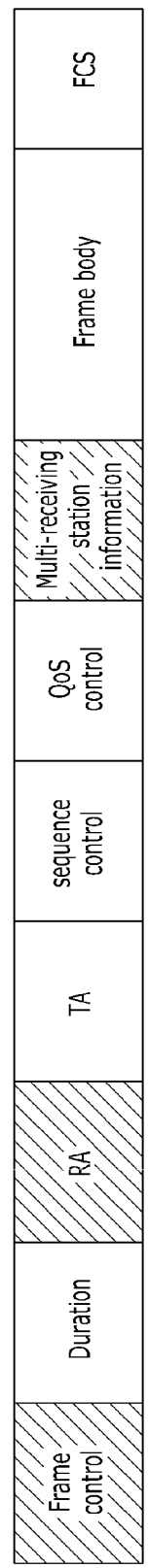
FIG. 1 is a diagram illustrating a structure of a frame including multi-user information where the present invention is applied.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

Hereinafter, a method for transmitting a request frame and a response frame according to embodiments of the present invention will be described based on a multi-user multiple input multiple output (MU-MIMO) wireless communication system defined in IEEE 802.11 among various high speed wireless communication systems. However, the embodiments of the present invention are not limited thereto. The method for transmitting a request frame and a response frame according to embodiments of the present invention may be applied to any wireless communication environments using a multi-channel technology or a multi-user multiple input multiple output (MU-MIMO) technology.

FIG. 1 is a diagram illustrating a structure of a frame including multi-user information where the present invention is applied to.

A frame control field includes a protocol field for indicating a protocol version such as an IEEE 802.11 MAC version, a type field or a subtype field for identifying a type of a frame in use, and additional fields for carrying various parameters to control a frame, such as a ToDS field, a FromDS field, an additional fragment field, a retry field, a power control field, an additional data field, a WEP field, and an order field.

A Duration field is used to set a network allocation vector. As the duration field of the present embodiment, a duration field included in a frame transmitted during a contention free period (CFP) or in a PS-Poll frame is used.

A sequence control field is used to discard a fragmentation/defragmentation frame or a duplicate frame. The sequence control information includes a 4-bits fragmentation number field and a 12-bit sequence number field.

The frame body field is a typical data field. The frame body field includes a payload. A frame check sequence (FCS) is used for integrity check of a frame received from a predetermined station.

As described above, a MAC frame essentially includes the frame control field, the duration field, a receiving address (RA) field, and a FCS field. The remaining fields may be excluded or added according to a type of a frame for saving wireless resources. For example, a QoS control field may be excluded in case of a data frame not using QoS. In case of an IEEE 802.11n dedicated frame, a HT control field is additionally included for a HT function as well as the QoS control field.

The frame control information may be analyzed by all stations in order to detect a type of a received frame. The duration information may be analyzed by all stations to prevent collision between frames on a wireless medium. The receiving address may be analyzed by all stations for determining whether a destination address of a received frame is an own address or not. When the destination address of the received frame is the own address, the receiving station decodes the remaining information of the received frame.

In order to include information on a plurality of receiving stations in a frame, it is required to include an indicator in one of fields that can be analyzed by all stations. Such an indicator may indicate that a frame having information on a plurality of receiving stations. Further, multi-user information is additionally included in the frame. Referring to FIG. 1, a predetermined bit in the frame control field or the receiving address (RA) field may be used as the indicator that indicates that a frame includes multi-user information.

In a general method for responding a frame requiring an immediate response, a response frame is transmitted with a short time interval such as SIFS after receiving a request frame as described above. However, when the request frame requiring the immediate response includes the multi-user information, response frames may be collided because a plurality of stations transmits the response frames at the same time. In order to overcome such a problem, a method for sequentially transmitting response frames at a plurality of stations was introduced.

FIG. 2 is a diagram illustrating a frame including multi-user information in accordance with a first embodiment of the present invention. That is, the frame of FIG. 2 has a format for sequentially transmitting a response frame at a corresponding transmission time at a plurality of wireless stations.

Referring to FIG. 2, a multi-user information field includes multi-user identifier (ID) information and response frame transmission time information. The response frame transmission time information denotes a time of transmitting a response frame corresponding to each user. The multi-user identifier (ID) information denotes a unique value of a wireless station such as a MAC address or an Association ID. The response frame transmission time for a $k^{th}$ user may be decided by a sum of duration TX_RSP_DURk-1 for transmitting response frames of a first user to a $(k-1)^{th}$ user and short inter-frame spaces (SIFS) therebetween.

In case of a first embodiment of the present invention, a transmitting station includes the multi-user information with the response frame transmission time information in a request frame and transmits the request frame to a plurality of receiving stations. Accordingly, each receiving station transmits a response frame at a corresponding response frame transmission time to a transmitting station.

Hereinafter, a method for sequentially transmitting response frames at a plurality of stations in accordance with a second embodiment of the present invention will be described.

In the second embodiment of the present invention, a token scheme is used. In the token scheme, a multi-user request frame includes information on the number of user stations transmitting a response frame and user station IDs. Response frames are sequentially transmitted by transmitting the multi-user request frame.

FIGS. 3 and 4 illustrate a structure of multi-user information in a token scheme in accordance with an embodiment of the present invention.

Referring to FIG. 3, the multi-user information includes the number of tokens and a next multi-user ID list for transmitting a next response frame. In case of using the token scheme according to the second embodiment of the present invention, a transmitting station transmitting a request frame records information on an ID of a wireless station to transmit a response frame with a short inter-frame space (SIFS) among multiple users in a receiving address (RA) field, sets up a token value denoting the number of multiple users to transmit a response frame, forms a next multi-user ID list for multiple users except the current receiving station, and transmits a request frame.

Referring to FIG. 4, a wireless station receiving a request frame reduces a token number by '1' after a short inter-frame space (SIFS), records an address of a wireless station to perform next response in a receiving address (RA) field, newly forms a multi-user ID list excluding the receiving station, and transmits a response frame. When a wireless station receives a response frame having 1 for a token value and Null for a multi-user ID list to perform next response, the wireless station sets up the token value to '0' indicating that the wireless station is the last user among the multiple users. Then, the wireless station transmits a response frame with Null as the multi-user ID list to an access point (AP). Accordingly, the access point can be aware of that all response processes are completely ended.

A response frame of each wireless station in the second embodiment of the present invention may perform the same function of a request frame to a wireless station performing next response. Further, transmission of a $(k+1)^{th}$ response frame may start within a short inter-frame space (SIFS) after receiving a $k^{th}$ response frame without calculating a response frame transmission time of a network wireless station. Accordingly, it is effective for time and channel synchronization, and it can be dynamically responded according to the movement of a wireless station.

Hereinafter, the second embodiment of the present invention will be described in detail with reference to FIGS. 5 to 7.

Figure 5:
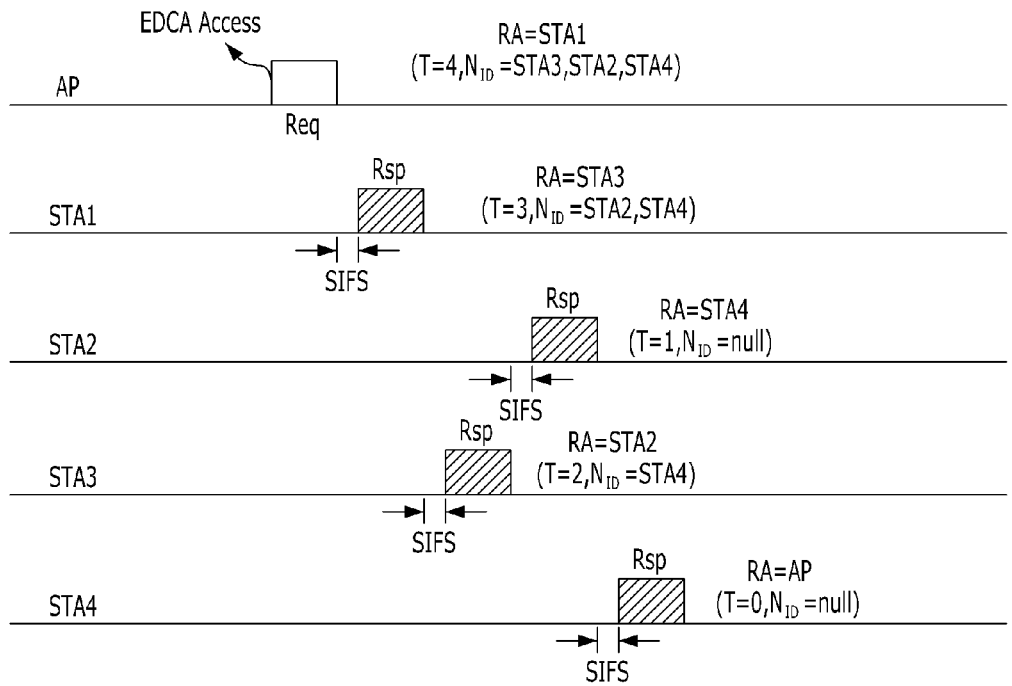
FIG. 5 is a diagram illustrating a method for transmitting a response frame using a token scheme in accordance with an embodiment of the present invention.

FIG. 5 is a diagram illustrating a method for transmitting a response frame at a plurality of wireless station in accordance with a second embodiment of the present invention.

Referring to FIG. 5, an access point (AP) transmits a request frame through enhanced distributed channel access (EDCA). In the request frame transmitted from the access point (AP), an address of a first wireless station STA1 is recorded in a receiving address (RA) field, for example, RA=STA1, three identifiers for wireless stations STA2 to STA4 are recorded in a next multi-user ID list (NID), and 4 is recorded as a token value (T=4).

The first wireless station STA1 receives the request frame from the access point (AP) and transmits a response frame Rsp after a short inter-frame space (SIFS). In the response frame transmitted from the first wireless station, an address of a third receiving station STA3 transmitting a next response frame is recorded in a receiving address (RA) field, a token value is reduced by '1' and set up as '3', and the multi-user ID list is formed of the second station STA2 and the fourth station STA4 by excluding the third station STA3.

The third wireless station STA3 receives the response frame from the first wireless station STA1 transmits a response frame (Rsp) after a short inter-frame space (SIFS). In the response frame transmitted from the third wireless station, an address of the second station (STA2) transmitting a next response frame is recorded in the RA field, the token value is reduced by '1' and set up as '2', and the next multi-user ID list is formed of the fourth station STA4.

The second wireless station (STA2) receives the response frame from the third wireless station STA3 and transmits a response frame Rsp after a short inter-frame space (SIFS). In the response frame transmitted from the second wireless station (STA2), an address of the fourth station (STA4) transmitting a next response frame is recorded in the RA field, the token value is reduced by '1' and set up as '1', and the next multi-user ID list is setup as null.

The fourth wireless station STA4 receives the response frame from the second wireless station STA2 and transmits a response frame Rsp after a short inter-frame space (SIFS). In the response frame transmitted from the fourth wireless station, an address of an access point is recorded in the RA field, the token value is reduced by '1' and set up as '0', and the next multi-user ID list is recorded as 'null'.

The access point (AP) receives the response frame from the fourth wireless station STA4. The access point (AP) recognizes that response is completely ended for all stations because the token value is setup as '0' and the next multi-user ID list is setup as 'null'.

In the second embodiment of the present invention, the request frame and the response frame are substantially exchanged among wireless stations. Accordingly, transmission failure can be dynamically processed in the second embodiment of the present invention.

Figure 6:
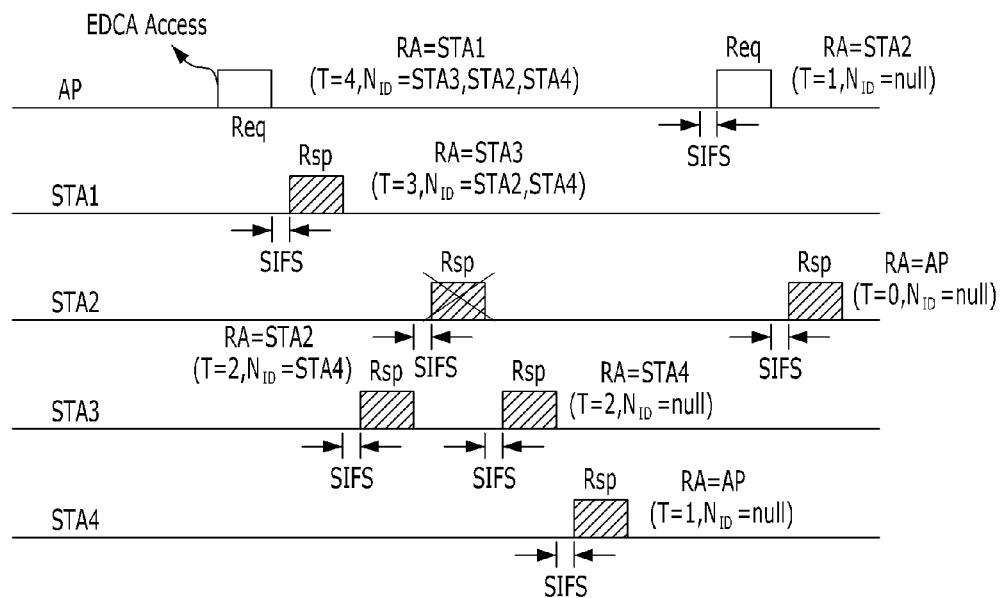
FIGS. 6 and 7 are diagrams illustrating a recovering method according to transmission failure of a response frame in a token scheme in accordance with an embodiment of the present invention.
Figure 7:
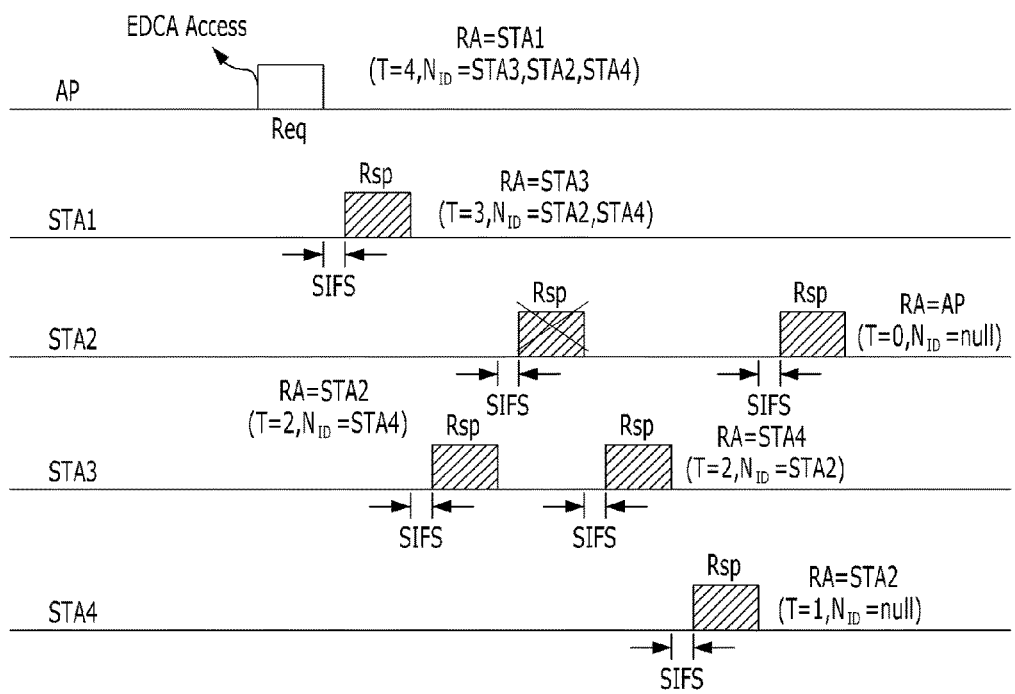

FIGS. 6 and 7 are diagrams illustrating a method for processing transmission failure of a response frame. FIGS. 6 and 7 show response failure occurred in a second wireless station STA2.

Referring to FIG. 6, the third wireless station STA3 records an address of the second station STA2 in a RA field after a short inter-frame space (SIFS), sets up a token value as '2' by reducing it by '1', and records the fourth station STA1 at the next multi-user ID list. Then, the third wireless station STA3 transmits the response frame.

When the second wireless station STA2 receiving the response frame from the third wireless station STA3 fails to transmit a response frame, all wireless stations including access points can be aware of the transmission failure of a response frame through monitoring a response frame.

Accordingly, the third wireless station STA3 records an address of the fourth wireless terminal STA4 in the RA field after a short inter-frame space (SIFS) after receiving a response frame of the second wireless station (STA2), sets up the token value as '2', sets up the next multi-user ID list as 'null', and transmits the response frame.

The fourth wireless station STA4 receives the response frame from the third wireless station STA3. Then, the fourth wireless station STA4 records an address of an access point (AP) in the RA field after a short inter-frame space (SIFS), sets up the token value as '1' by reducing it by '1', sets up the next multi-user ID list as 'null', and transmits the response frame.

The access point (AP) receives the response frame from the fourth wireless station STA4. Then, the access point (AP) transmits a request frame as an address of the second wireless station STA2 recorded in a RA field, which recognized as response frame transmission failure in the monitoring procedure. Accordingly, the second station STA2 transmits a response frame.

FIG. 7 is a diagram illustrating a recovery procedure for a transmission failure in a method for transmitting a response frame in accordance with a second embodiment of the present invention.

Referring to FIG. 7, the third wireless station STA3 records an address of the second wireless station STA2 in the RA field after a short inter-frame space (SIFS), sets up a token value as '2' by reducing it by '1', records the fourth wireless station STA4 in the next multi-user ID list.

When the second wireless station STA2 fails to transmit a response frame after receiving the response frame from the third wireless station STA3, all wireless stations including an access point can detect the response frame transmission failure through monitoring the response frame.

Accordingly, the third wireless station STA3 receives the response frame from the second wireless station STA2, records an address of the fourth wireless station STA4 in the RA field after a short inter-frame space (SIFS), sets up a token value as '2', sets up the next multi-user ID list as the second wireless station STA2, and transmits a response frame.

The fourth wireless station STA4 receives the response frame from the third wireless station STA3, records an address of the second wireless station STA2 in a RA field after a short inter-frame space (SIFS), sets up a token value as '1' by reducing it by '1', sets up the next multi-user ID list as 'null', and transmits the response frame.

The second wireless station STA2 receives the response frame from the fourth wireless station STA4, records an address of the access point (AP) in the RA field after a short inter-frame space (SIFS), sets up a token value as '0' by reducing it by '1', sets up the next multi-user ID list as 'null', and transmits the response frame.

The Access point receives the response frame from the second wireless station STA2 and recognizes that all wireless stations completely respond because the token value is '0' and the next multi-user ID list is 'null'.

Since the response frame shown in FIG. 7 may perform a function as a request frame for a next frame, a recovery procedure among wireless stations can be performed based on the response frame shown in FIG. 7. Also, the access point (AP) can monitor and manage such a procedure if the recovery procedure is delayed and has a problem among wireless stations.

Hereinafter, a method for exchanging a request frame and a response frame in accordance with a third embodiment of the present invention will be described with reference to FIGS. 8 and 9.

In the third embodiment of the present invention, all multi-user stations do not respond to a multi-request frame. A station transmitting a request frame designates predetermined stations and the designated stations transmit a response frame.

For example, a RTS/CTS control frame may reserve a wireless channel without collision through network allocation vector (NAV) setup for a long time such as a frame longer than a transmission request threshold (dot11RTSThreshold) or a transmission opportunity (TXOP).

In the third embodiment of the present invention, all multi-user stations do not transmit a response frame such as a CTS frame or an ACK frame when a RTS frame and a CTS frame are exchanged or when short data or an ACK frame therefor is exchanged. Only representative wireless station responses to the request frame to sense collision or perform a function of NAV setup.

Figure 8:
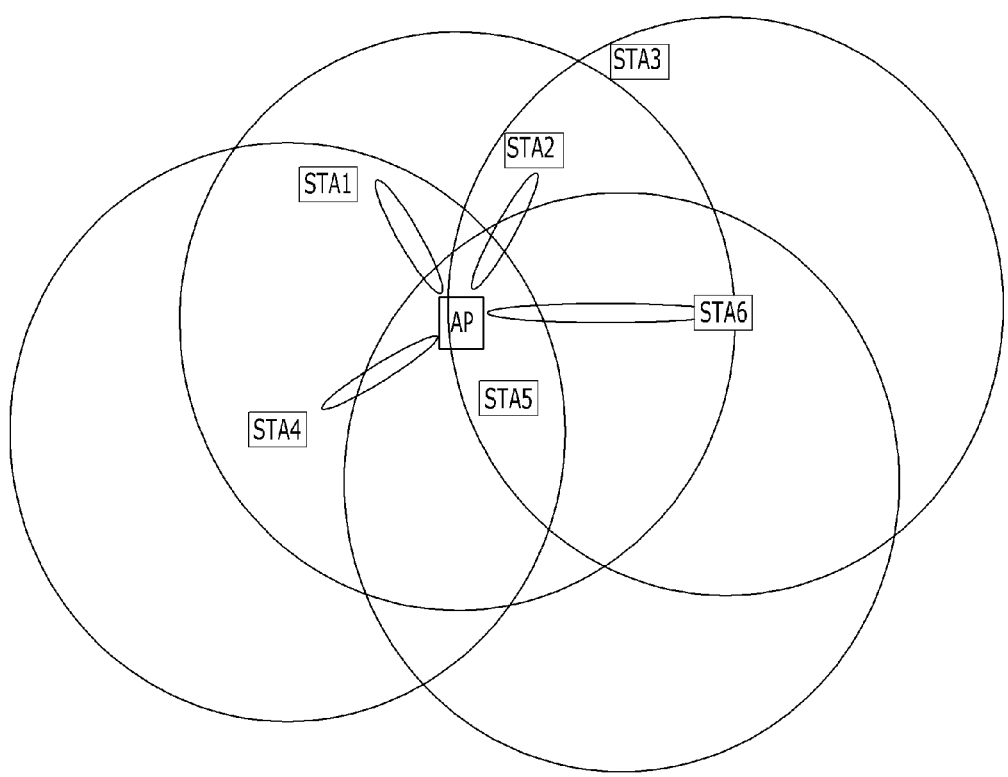
FIGS. 8 and 9 are diagrams illustrating a method for transmitting a response frame using a representative wireless station in accordance with a third embodiment of the present invention.

FIG. 8 illustrates a sixth wireless station STAG designated as a representative station to transmit a response frame in accordance with a third embodiment of the present invention.

Referring to FIG. 8, the access point (AP) selects a representative wireless station to transmit a response frame from a plurality of stations in consideration of various wireless environment factors such as a channel quality. For example, a wireless station in the worst wireless environment may be selected as the representative wireless station from a plurality of wireless stations using channel information. Further, a wireless station that previously failed to respond is determined as a wireless station in the worst wireless environment and selected as a representative wireless station.

Referring to FIG. 8, a sixth wireless station STA6 is a wireless channel farthest from an access point. The sixth wireless station STA6 is selected as a wireless station to transmit a response frame. The sixth wireless station STA6 selects a high reliable modulation and coding scheme (MCS) to safely transfer a response frame to the access point (AP). Accordingly, a plurality of wireless stations receiving the response frame from the sixth station STA6 can be aware of channel use information.

The access point (AP) receiving a response frame can transmit a multiuser data frame by performing long NVA setup for transmitting data. Accordingly, better performance can be obtained through MU-MIMO technology by reducing overhead of receiving a response frame from all wireless stations and obtaining a use right for a channel.

Figure 9:
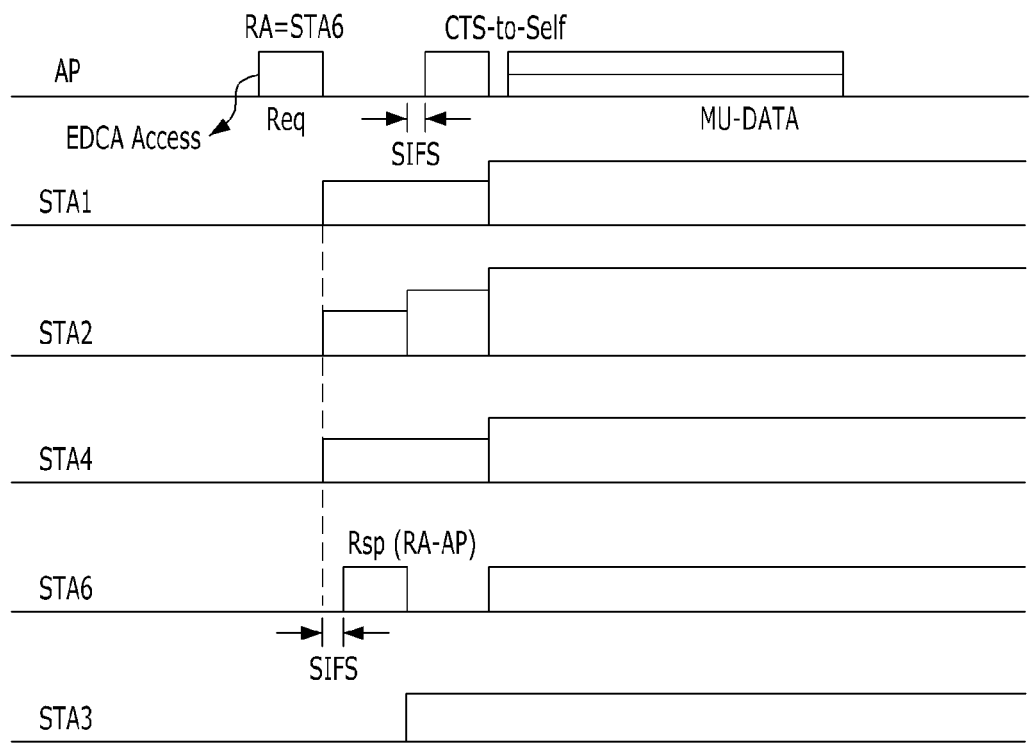

FIG. 9 is a diagram illustrating a method for transmitting a frame using a representative wireless station designated to transmit a response frame in accordance with an embodiment of the present invention.

Referring to FIG. 9, a second wireless station STA2 may receive all frames from an access point and a sixth wireless station designated as a representative wireless station. Such a second wireless station STA2 can update NAV by receiving a request frame and a response frame. The wireless stations STA1 and STA4 perform a channel NAV setup process by a request frame transmitted from the access point.

The third wireless station STA3 may setup a channel NAV using a representative response frame received from the sixth wireless station STA6.

In FIG. 9, an address of a station receiving a request frame transmitted from the access point (AP) is set up as an address of a sixth station STA6 which is a representative station to transmit a response frame. As described above, the request frame can support comparability because the request frame maintains an existing frame format without modification. Meanwhile, when data transmission is performed at the same time using a MU-MIMO technology, and when a request frame requires information on multi-user stations, a response frame may include information on the number of multi-user stations and a multi-user ID list as described in FIG. 3.

In FIG. 9, if an access point (AP) fails to transmit a response frame due to a response frame time out, the access point (AP) retransmits a request frame by selecting other wireless station as a representative wireless station to transmit a response frame or retries the transmission of the sixth station STAG.

The embodiments of the present invention were described to be applied to the immediate response scheme. However, the embodiments of the present invention may be applied to a delayed response scheme that transmits an ACK frame at a time of transmitting an immediate response frame from each wireless station and transmits a response frame for the request frame through channel access.

For example, the embodiments of the present invention can be applied to when a station does not receive a response frame having request information on a predetermined request frame not designated as a CTS frame for a RTS frame or an ACK frame for data. In case of the first embodiment of the present invention, a multi-user station receiving an ACK frame at a transmission time of a response frame individually transmits a response frame for a request frame through basic channel access.

Since a response frame can be a request frame for a next wireless station in case of the second embodiment of the present invention, an ACK frame does not include information requested by a request frame. However, the response frame includes a MAC address value of a next multi-user station in a receiving address (RA) field and a next multi-user station list to perform a response procedure after a token value. When the access point receives a legacy ACK frame not including such request information, the access point (AP) regenerates and retransmits a request frame for next multi-user stations to perform a response procedure after the multi-user station transmitting the ACK frame.

Meanwhile, the above described method for processing a multiuser frame in accordance with an embodiment of the present invention can be realized as a program and stored in a computer-readable recording medium such as CD-ROM, RAM, ROM, floppy disks, hard disks, magneto-optical disks, and the likes. Since the process can be easily implemented by those skilled in the art to which the present invention pertains, further description will not be provided herein.

While the present invention has been described with respect to the specific embodiments, it will be apparent to those skilled in the art that various changes and modifications may be made without departing from the spirit and scope of the invention as defined in the following claims.

The invention claimed is:

1. A wireless communication method, comprising:
   receiving, at a first station, a first frame for requesting channel information, the first frame including a first field comprising duration information, a second field comprising a first identifier and a third field comprising a second identifier; and
   transmitting, at the first station, a second frame as a response to the first frame,
   wherein:
   the first field precedes the second field and the second field precedes the third field in the first frame,
   if the first identifier is associated with the first station, the second frame is transmitted without receiving, at the first station, any additional frame identifying the first station, and
   if the second identifier is associated with the first station, the second frame is transmitted after the first station receives a third frame identifying the first station.

2. The method of claim 1, wherein each of the first identifier and the second identifier is an association identifier (AID).

3. The method of claim 1, wherein the duration information is determined based on a sum of an estimated time required for the first station to transmit the second frame plus a first predetermined period of time.

4. The method of claim 3, wherein the first predetermined period of time is a period of Short Interframe Space (SIFS).

5. The method of claim 1, wherein the second frame is transmitted through an enhanced distributed channel access (EDCA).

6. The method of claim 1, the method further comprising:
   if the first identifier is associated with the first station, receiving a fourth frame from a second station, the fourth frame including a fourth field comprising the second identifier identifying the second station.

7. The method of claim 1, wherein the first frame is received from an access point.

8. A first station device, comprising:
   a memory; and
   a processor operably coupled to the memory,
   wherein the processor, when executing program instructions stored in the memory, is configured to:
   cause the first station device to receive a first frame for requesting channel information, the first frame including a first field comprising duration information, a second field comprising a first identifier and a third field comprising a second identifier; and
   cause the first station device to transmit a second frame as a response to the first frame,
   wherein:
   the first field precedes the second field and the second field precedes the third field in the first frame,
   if the first identifier is associated with the first station device, the second frame is transmitted without receiving, at the first station device, any additional frame identifying the first station device, and
   if the second identifier is associated with the first station device, the second frame is transmitted after the first station device receives a third frame identifying the first station device.

9. The device of claim 8, wherein each of the first identifier and the second identifier is an association identifier (AID).

10. The device of claim 8, the duration information is determined based on a sum of an estimated time required for the first station device to transmit the second frame plus a first predetermined period of time.

11. The device of claim 10, wherein the first predetermined period of time is a period of Short Interframe Space (SIFS).

12. The device of claim 8, wherein the second frame is transmitted through an enhanced distributed channel access (EDCA).

13. The device of claim 8, wherein the processor, when executing the program instructions, causes the first station device to receive, if the first identifier is associated with the first station device, a fourth frame from a second station, the fourth frame including a fourth field comprising the second identifier identifying the second station.

14. An apparatus in a first station, the apparatus comprising:
a memory;
a processor operably coupled to the memory,
wherein the processor, when executing program instructions stored in the memory, is configured to:
cause the first station to receive a first frame for requesting channel information, the first frame including a first field comprising duration information, a second field comprising a first identifier and a third field comprising a second identifier; and
cause the first station to transmit a second frame as a response to the first frame,
wherein:
the first field precedes the second field and the second field precedes the third field in the first frame,
if the first identifier is associated with the first station, the second frame is transmitted without receiving, at the first station, any additional frame identifying the first station, and
if the second identifier is associated with the first station, the second frame is transmitted after the first station receives a third frame identifying the first station.

15. The apparatus of claim 14, wherein each of the first identifier and the second identifier is an association identifier (AID).

16. The apparatus of claim 14, wherein the duration information is determined based on a sum of an estimated time required for the apparatus to transmit the second frame plus a first predetermined period of time.

17. The apparatus of claim 14, wherein an order of the second field and the third field indicates that a second station transmits a response frame subsequent to the second frame by the first station.

18. An apparatus, comprising:
a memory;
a processor operably coupled to the memory,
wherein the processor, when executing program instructions stored in the memory, is configured to:
cause the apparatus to transmit a first frame for requesting channel information, the first frame including a first field comprising duration information, a second field comprising a first identifier and a third field comprising a second identifier; and
cause the apparatus to receive a second frame from a first station as a response to the first frame,
wherein:
the first field precedes the second field and the second field precedes the third field in the first frame,
if the first identifier is associated with the first station, the second frame is transmitted from the first station without the first station receiving any additional frame identifying the first station, and
if the second identifier is associated with the first station, the second frame is transmitted from the first station after the first station received a third frame identifying the first station.

19. The apparatus of claim 18, wherein each of the first identifier and the second identifier is an association identifier (AID).

20. A wireless communication method, comprising:
transmitting a first frame for requesting channel information, the first frame including a first field comprising duration information, a second field comprising a first identifier and a third field comprising a second identifier; and
receiving a second frame from a first station as a response to the first frame,
wherein:
the first field precedes the second field and the second field precedes the third field in the first frame,
if the first identifier is associated with the first station, the second frame is transmitted from the first station without the first station receiving any additional frame identifying the first station, and
if the second identifier is associated with the first station, the second frame is transmitted from the first station after the first station receiving a third frame identifying the first station.

21. The method of claim 20, wherein each of the first identifier and the second identifier is an association identifier (AID).

22. The method of claim 20, wherein the duration information is determined based on a sum of an estimated time required for the first station to transmit the second frame plus a first predetermined period of time.

* * * * *